(12) United States Patent
Hammerschmidt

(10) Patent No.: US 12,181,310 B2
(45) Date of Patent: Dec. 31, 2024

(54) DEVICE AND METHOD FOR CALIBRATING A MAGNETIC ANGLE SENSOR

(71) Applicant: Infineon Technologies AG, Neubiberg (DE)

(72) Inventor: Dirk Hammerschmidt, Finkenstein (AT)

(73) Assignee: Infineon Technologies AG, Neubiberg (DE)

( * ) Notice: Subject to any disclaimer, the term of this patent is extended or adjusted under 35 U.S.C. 154(b) by 205 days.

(21) Appl. No.: 17/740,594

(22) Filed: May 10, 2022

(65) Prior Publication Data

US 2022/0364891 A1 Nov. 17, 2022

(30) Foreign Application Priority Data

May 17, 2021 (DE) .......................... 102021112732.7

(51) Int. Cl.
*G01D 18/00* (2006.01)
*G01D 5/14* (2006.01)

(52) U.S. Cl.
CPC ............. *G01D 18/001* (2021.05); *G01D 5/14* (2013.01); *G01D 18/008* (2013.01); *G01D 5/145* (2013.01)

(58) Field of Classification Search
CPC ...... G01D 18/001; G01D 18/008; G01D 5/14; G01D 5/145; G01D 5/24471; G01D 5/24476; G01D 5/2448
See application file for complete search history.

(56) References Cited

U.S. PATENT DOCUMENTS

| 6,018,881 | A | * | 2/2000 | Spies | ..................... G01D 5/145 33/708 |
| 6,029,363 | A | * | 2/2000 | Masreliez | ............ G01D 5/2449 33/708 |
| 6,401,052 | B1 | * | 6/2002 | Herb | .................... G01D 5/2448 356/498 |
| 8,384,570 | B2 | * | 2/2013 | Hunter | ............... G01D 5/24495 341/1 |

(Continued)

FOREIGN PATENT DOCUMENTS

DE 102004038621 B3 2/2006
DE 19914447 A1 6/2006

(Continued)

*Primary Examiner* — Steven L Yeninas
(74) *Attorney, Agent, or Firm* — Harrity & Harrity, LLP

(57) ABSTRACT

A method for calibrating a magnetic angle sensor includes measuring, for a plurality of angle positions within a 360° rotation of a measurement object, in each case a first sensor signal for a first magnetic field component and a second sensor signal for a second magnetic field component orthogonal to the first magnetic field component, wherein the first and second sensor signals are in each case 360° periodic and representable as a Fourier series with a Fourier component of a fundamental and a Fourier component of a harmonic; determining the Fourier component of the harmonic for the first and second sensor signals based on a difference between a trajectory defined by the measured first and second sensor signals and a circular path; and correcting the angle positions based on the Fourier component of the harmonic determined for the first and second sensor signals.

20 Claims, 10 Drawing Sheets

(56) References Cited

U.S. PATENT DOCUMENTS

| | | | |
|---|---|---|---|
| 2004/0012386 A1* | 1/2004 | Haas | G01D 5/145 |
| | | | 341/15 |
| 2005/0278137 A1* | 12/2005 | Hammerschmidt | ......... |
| | | | G01D 5/2448 |
| | | | 702/151 |
| 2006/0076480 A1* | 4/2006 | Kiriyama | G01D 18/001 |
| | | | 250/231.16 |
| 2006/0077083 A1* | 4/2006 | Kiriyama | G01D 5/2449 |
| | | | 341/120 |
| 2008/0116886 A1* | 5/2008 | Yamada | G01D 5/145 |
| | | | 324/207.21 |
| 2012/0222465 A1* | 9/2012 | Lippuner | G01D 18/001 |
| | | | 73/1.75 |
| 2018/0231401 A1* | 8/2018 | Okumura | G01D 5/2451 |
| 2020/0284626 A1* | 9/2020 | Peng | G01D 5/2448 |
| 2022/0018687 A1* | 1/2022 | Cosgrave | G01D 3/08 |
| 2022/0187105 A1* | 6/2022 | Yoshihiro | G01D 5/2448 |
| 2023/0079776 A1* | 3/2023 | Zhou | H02K 7/06 |
| | | | 702/104 |

FOREIGN PATENT DOCUMENTS

| | | |
|---|---|---|
| DE | 102017115916 A1 | 1/2019 |
| DE | 102019121392 A1 | 2/2021 |
| EP | 1647810 A1 | 4/2006 |
| EP | 1647811 A1 | 4/2006 |
| EP | 2302329 A2 | 3/2011 |
| EP | 3401644 A1 | 11/2018 |
| JP | 2006090738 A | 4/2006 |
| JP | 2013096756 A | 5/2013 |

\* cited by examiner

--Prior Art--

--Prior Art--

--Prior Art--

DEVICE AND METHOD FOR CALIBRATING A MAGNETIC ANGLE SENSOR

FIELD

The present disclosure relates to devices and methods for calibrating magnetic angle sensors.

BACKGROUND

Angle sensors for non-contact detection of rotations are used in automotive technology, for example. Rotation angle sensors can be realized for example by means of magnetic field sensors (such as e.g., Hall sensors or magnetoresistive sensors) positioned in the vicinity of a rotating measurement object, such as a shaft, for example. In this case, a first measurement value (e.g., x-signal) of a first sensor element can be ascertained as a function of a magnetic field at the location of the first sensor element, which is dependent on a rotation angle $\alpha$ of the measurement object. Furthermore, a second measurement value (e.g., y-signal) of a second sensor element can be ascertained as a function of a magnetic field at the location of the second sensor element, which is dependent on the rotation angle $\alpha$ of the measurement object. The two measurement values ideally correspond to 360°-periodic signals in the form $x=A*\cos(\alpha)$ and $y=A*\sin(\alpha)$. By way of the known specification $\alpha=\operatorname{atan}(y/x)$, the rotation angle $\alpha$ of the measurement object can then be deduced.

In practice, mechanical misalignments between sensor elements and measurement objects often cannot be entirely avoided, however, such that different amplitudes, offsets and phase shifts of the periodic signals x and y occur, which can in turn result in erroneous angle estimations. Some causes of mechanical misalignments are x-, y-displacement between sensor elements and measurement object or magnet, air gap variation (z-displacement), inclination of various types (for example package or housing inclination) and/or magnetization inclination. Errors of this type can be reduced by means of so-called self-calibrations or autocalibrations, for example.

Self-calibrating magnetic angle sensors can considerably improve a measurement accuracy over their lifetime by eliminating lifetime drift and mismatches between a magnetic field during a backend calibration and an application device. Furthermore, a self-calibration (autocalibration) makes it possible to avoid a temperature compensation since the calibration can adapt permanently to the actual use conditions including all temperature effects.

One possibility for carrying out the self-calibration is to acquire a set of characteristic measurement points of x- (cos-) and y- (sin-) signals over a 360° angle range. A typical choice that enables a simple evaluation is the x- and y-value pairs at the minimum and maximum values of each channel. As soon as these data have been acquired, the compensation parameters for offset and amplitude can easily be found and applied to the sensor channels. The offset of a channel is the mean value of the minimum and the maximum for the channel. The amplitude of each channel can be determined as half of the difference between the maximum and the minimum and can be used to adapt the gain of the measurement channel such that a compensated amplitude corresponds to a target value (e.g., 1). After the offset and amplitude compensation, the zero crossings (phase) of one channel can be compared with the minimum and the maximum of the other channel and the result can be used for the compensation of a non-orthogonality between the x- and y-signals.

It is furthermore known that angle sensors do not yield ideal sin and cos terms for the y- and x-components of the measurement field. Consequently, a compensation of the offset, of the amplitude and of the non-orthogonality (phase shift) of the sensor can only attain measurement accuracies that are limited by non-compensated harmonic terms (harmonics of a fundamental). The x- and y-signals measured in reality are necessarily 360° periodic and can thus be described as a Fourier series. Accordingly, amplitude, phase and offset, of each channel can be interpreted as Fourier components of the fundamental. Approaches for correcting these deviations can use a spectral analysis (FFT, DFT) of the measured signal in order to obtain the Fourier components that describe the measured signal including its harmonic distortion components. With these Fourier components, correction terms can be calculated and subtracted from the measured signal in order to eliminate the distortion. A residual inaccuracy remains since the angle that can be used for the calculation of the harmonic correction terms is the inaccurate angle derived from the uncorrected x- and y-measurements. One disadvantage of this method arises from the necessity of having angle-equidistant samples of the x- and y-signals over an integer multiple of 360° rotations for the Fourier analysis. For a system with a constant sampling frequency, this means that a constant rotational speed of the measured rotation is required, which is a very rare condition for many applications, such as e.g., electric vehicle motors or power assisted steering motors. Alternatively, the equidistant points can also be interpolated, but this causes additional outlay and additional inaccuracies. Consequently, the self-calibration cannot be carried out regularly and it is unforeseeable how much deviation has occurred since the last successful self-calibration, e.g., on account of temperature changes or variation of the mechanical and magnetic set-up.

Therefore, there is a need for improved self-calibrations for angle sensors.

SUMMARY

This need is taken into account by devices and methods as claimed in the independent claims. The dependent claims relate to advantageous developments.

In accordance with a first aspect of the present disclosure, a method for calibrating a magnetic angle sensor is proposed. This involves measuring, for a plurality of angle positions within a 360° rotation of a measurement object, in each case a first sensor signal for a first magnetic field component (e.g., x-component) and a second sensor signal for a second magnetic field component (e.g., y- or z-component) orthogonal to the first magnetic field component. The first and second sensor signals are in each case 360° periodic and representable as a Fourier series with at least one Fourier component of a harmonic of a fundamental. A Fourier component here can include in each case an amplitude value, a phase value and optionally also an offset value (e.g., for the fundamental). In accordance with the proposed method, the Fourier component of the harmonic is determined in each case for the first and second sensor signals on the basis of a difference between a trajectory described by the measured first and second sensor signals and a circular path (e.g., the unit circle). The angle positions are corrected on the basis of the at least one Fourier component of the harmonic determined for the first and second sensor signals.

The proposed self-calibration carried out for ascertaining the corrective Fourier components for eliminating harmonic distortions can be calculated by way of a fit of the circular path of a measurement in the x/y-plane. The fact that the samples used for the fit do not have to be equidistant and can even originate from different rotations of the measurement object can be regarded as an advantage of the proposed self-calibration.

In accordance with some exemplary embodiments, measuring the first and second sensor signals optionally includes determining the respective Fourier component of the fundamental by means of a—described in the introduction—error compensation or self-calibration of offset, amplitude and orthogonality of the first and second sensor signals. Such methods for self-calibration of the fundamental are known from the prior art.

In accordance with some exemplary embodiments, optionally a Fourier component of at least one harmonic for the first sensor signal is determined independently of a Fourier component of the harmonic for the second sensor signal. As a result, a complexity of the proposed method can be reduced to just two dimensions.

In accordance with some exemplary embodiments, optionally a Fourier component of an m-th order (m≥2) harmonic is determined independently of a Fourier component of an n-th (n≠m, n≥2) order harmonic. That is possible since the harmonics of different orders are orthogonal functions.

In accordance with some exemplary embodiments, correcting an angle position optionally includes the following:
  correcting the first sensor signal (e.g., x-signal) corresponding to the angle position on the basis of the at least one Fourier component of the harmonic determined for the first sensor signal in order to obtain a corrected first sensor signal,
  correcting the second sensor signal (e.g., y-signal) corresponding to the angle position on the basis of the at least one Fourier component of the harmonic determined for the second sensor signal in order to obtain a corrected second sensor signal,
  forming a tangent function (e.g., arctan) of the corrected first and second sensor signals.

In accordance with some exemplary embodiments, the at least one Fourier component of the harmonic is optionally determined by means of a compensation calculation method, such that a deviation between the circular path and a trajectory described by the trajectory of the first and second sensor signals supplemented by the respective Fourier component of the harmonic becomes minimal. By way of example, the at least one Fourier component of the harmonic can be determined by means of the least mean squares method.

In accordance with some exemplary embodiments, the corrected angle positions can optionally be stored in a look-up table. A computational complexity during the operation of the magnetic angle sensor can be reduced as a result.

In accordance with some exemplary embodiments, the plurality of the measured angle positions within the 360° rotation of the measurement object optionally satisfies the Nyquist-Shannon sampling theorem for the at least one harmonic. That means that a condition to be satisfied should be the satisfying of the Nyquist-Shannon sampling theorem for the highest relevant harmonic distortion of the magnetic field sensor signal. Optionally, an optimization of each individual Fourier component can also be effected with different data sets. In particular, a data set for lower-order Fourier components, in accordance with the sampling theorem, can also contain fewer points than a data set for the higher-order Fourier components.

In accordance with some exemplary embodiments, the at least one Fourier component of the harmonic optionally includes a corresponding Fourier coefficient (amplitude) and phase value.

In accordance with a further aspect of the present disclosure, a method for calibrating a magnetic angle sensor is proposed. This involves acquiring, for a plurality of angle positions within a 360° rotation of a measurement object, in each case a first sensor signal for a first magnetic field component (e.g., x-component) and a second sensor signal for a second magnetic field component (y-component) orthogonal to the first magnetic field component. The first and second sensor signals are in each case 360° periodic and representable as a Fourier series with at least one Fourier component of a harmonic of a fundamental. The at least one Fourier component of the harmonic is determined for the first and second sensor signals in such a way that a deviation between a circular path (e.g., the unit circle) and a trajectory described by the first and second sensor signals supplemented by the respective Fourier components of the harmonic becomes minimal. The angle positions are corrected on the basis of the Fourier components of the harmonic determined for the first and second sensor signals.

In accordance with some exemplary embodiments, the at least one Fourier component of the harmonic is optionally determined by means of a compensation calculation method, such that the deviation between the circular path and the trajectory becomes minimal.

In accordance with yet another aspect of the present disclosure, a device for calibrating a magnetic angle sensor is proposed, which device is configured to carry out a method as claimed in any of the preceding claims. The device can be for example a programmable hardware component, such as e.g., a digital signal processor, or a dedicated hardware component, such as e.g., an ASIC.

BRIEF DESCRIPTION OF THE DRAWINGS

Some examples of devices and/or methods are explained in greater detail merely by way of example below with reference to the accompanying figures, in which.

DETAILED DESCRIPTION

Some examples will now be described more thoroughly with reference to the accompanying figures. However, further possible examples are not restricted to the features of these embodiments described in detail. These may have modifications of the features and counterparts and alternatives to the features. Furthermore, the terminology used herein for describing specific examples is not intended to be limiting for further possible examples.

Throughout the description of the figures, identical or similar reference signs refer to identical or similar elements or features which can be implemented in each case identically or else in modified form, while they provide the same or a similar function. In the figures, furthermore, the thicknesses of lines, layers and/or regions may be exaggerated for elucidation purposes.

If two elements A and B are combined using an "or", this should be understood such that all possible combinations are disclosed, i.e., only A, only B, and A and B, unless expressly defined otherwise in an individual case. As alternative wording for the same combinations, it is possible to use "at least one from A and B" or "A and/or B". That applies equivalently to combinations of more than two elements.

If a singular form, e.g., "a, an" and "the" is used and the use of only a single element is defined neither explicitly nor implicitly as obligatory, further examples can also use a plurality of elements in order to implement the same function. If a function is described below as being implemented using a plurality of elements, further examples can implement the same function using a single element or a single processing entity. Furthermore, it goes without saying that the terms "comprises", "comprising", "has" and/or "having" in their usage describe the presence of the specified features, integers, steps, operations, processes, elements, components and/or a group thereof, but do not exclude the presence or the addition of one or more other features, integers, steps, operations, processes, elements, components and/or a group thereof.

Figure 1:
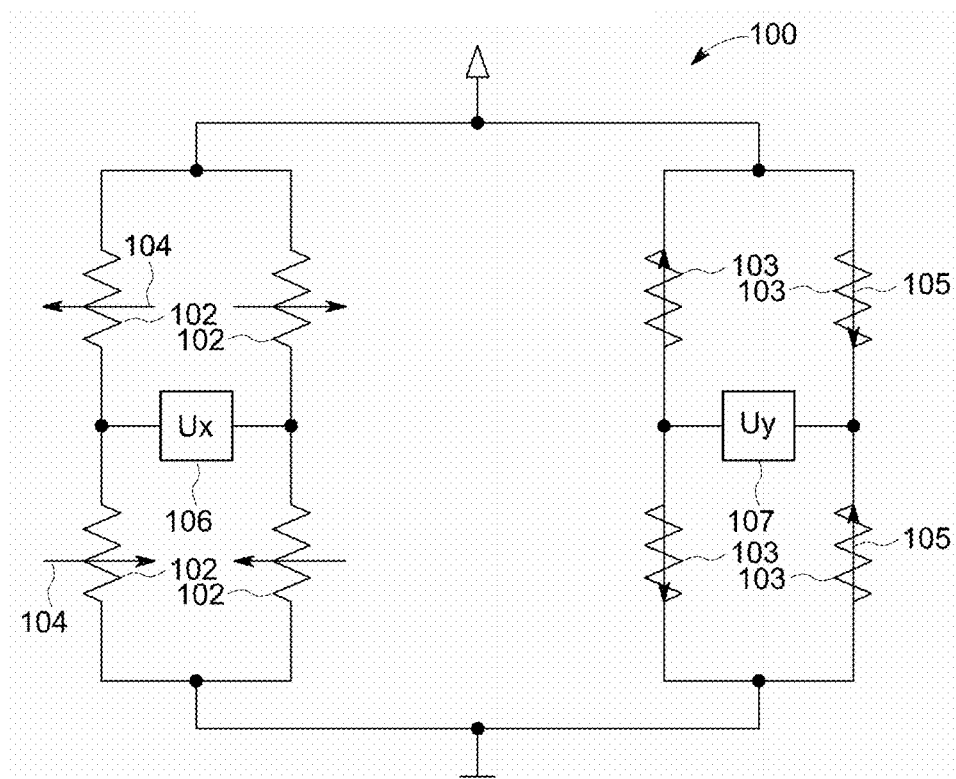
FIG. 1 shows a schematic illustration of a magnetic field sensor.

FIG. 1 shows one possible implementation of an angle sensor 100 in the form of an exemplary GMR measuring bridge (GMR=Giant Magneto-Resistance). It will be immediately apparent to the person skilled in the art that it is perfectly possible for configurations other than that shown FIG. 1 also to be used as an angle sensor. Alternative sensors are for example AMR sensors (AMR=Anisotropic Magneto-Resistance), TMR sensors (TMR=Tunnel Magneto-Resistance), Hall sensors, or inductive angle sensors, to mention just a few.

Angle sensors based on the GMR or TMR effect according to the spin valve principle can have advantages in comparison with AMR sensors. In this regard, rotation angle sensors based on the GMR effect can have an inherent 360° unambiguity if a bridge arrangement is used, and also a higher sensitivity than AMR sensors. Therefore, the use of rotation angle sensors based on the GMR effect can entail both performance advantages and cost advantages. In order to realize a 360° detection by means of spin valve GMR/TMR structures, a plurality of layer systems can be interconnected to form two Wheatstone bridges. A maximum signal can thus be obtained. In this case, one of the bridges has reference magnetizations that are perpendicular to reference magnetizations of the other bridge. Within each of the two bridges, the reference magnetizations are arranged antiparallel. Consequently, the two bridges yield sinusoidal main signals which are dependent on the rotation angle of an external magnetic field and which (ideally) are phase-shifted by 90° with respect to one another. The two main signals are also referred to hereinafter as sine main signal and cosine main signal and correspond to a fundamental. A further influence of harmonic terms or harmonics will also be explained later.

The magnetic field sensor 100 in FIG. 1 comprises first magnetoresistive sensor elements 102 aligned with a first preferred direction 104, and also second magnetoresistive sensor elements 103 aligned with a second premagnetization direction 105. Four first magnetoresistive sensor elements 102 are interconnected to form a first bridge circuit. Four second magnetoresistive sensor elements 103 are likewise interconnected to form a second bridge circuit. The first measuring bridge is configured to detect a component of the first preferred direction 104 of a magnetic field (e.g., x-direction), and the second measuring bridge is configured to detect a second component of the second preferred direction 104 of the magnetic field to be detected (e.g., y-direction). The first measuring bridge is configured to generate a first bridge voltage $U_x$ 106 corresponding to the first component of the magnetic field, namely the component along the first premagnetization direction or preferred direction. The second measuring bridge is configured for generating a second bridge voltage $U_y$ 107 corresponding to a second component, namely the component of the magnetic field to be detected along the second premagnetization direction.

The principle of the rotation angle measurement is based on the fact that a two-dimensional coordinate system is sufficient for ascertaining an angle. The measuring system supplies an x-value and a y-value, relative to an origin of the coordinate system, for example the voltages $U_x$, $U_y$ of a measurement point as shown in FIG. 1. From this xy-value pair, the associated angle α of the measurement point can be calculated by means of a microprocessor-suitable method. If all the measurement values $U_x$, $U_y$ then lie on an exact circular path (e.g., unit circle), the calculated angle describes the absolute position of the rotation angle accurately. If for example a magnet is rotated over two magnet sensors and e.g., one sensor is aligned in the x-axis and the second sensor in the y-axis, then the sine and cosine components of the circular movement are detected. The angle α can be deduced by way of the arc-tangent function atan(y/x). Since the angle α specifies a direction of the measurement point relative to the coordinate system, this application can be used as an angle sensor.

Figure 2:
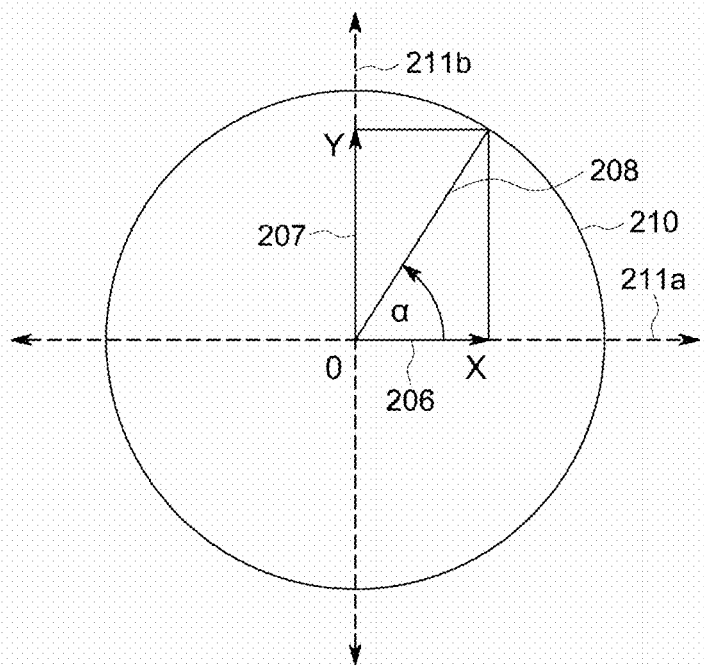
FIG. 2 shows a measurement circle.

FIG. 2 elucidates the principle of the angle measurement. An x-component and a y-component are plotted in a rectangular coordinate system. A first component 206 of a detected magnetic field direction 208, in this case the x-component, is plotted in the direction of a first axis 211a, in this case the x-axis. A second component 207 of the detected magnetic field direction 208, in this case the y-component, is plotted in a direction along a second axis 211*b*, in this case a y-axis. An angle α of the magnetic field direction 208 can be calculated from the x- and y-components detected, for example by the magnetic field sensor shown in FIG. 1. The direction vector of the magnetic field direction 208 corresponds to a diagonal of a rectangle spanned by the x-component 206 and the y-component 207. The angle α of the magnetic field direction 208 can thus be calculated by means of an arctan calculation from the x-component 206 and the y-component 207.

However, if the measurement points no longer lie on an ideal circular path, but rather on an inclined, displaced elliptic path with non-orthogonal axes, then a deviation of the calculated angle from the actual angle of a direction to be detected occurs. Deviations from orthogonality between the two measuring bridge elements, differences in the measuring bridge sensitivities and different offset errors can lead to a deviation from the ideal circular path. The general path course is elliptic, and has a displaced center point and an inclined axial position. The influences mentioned may be aging- and temperature-dependent, for example. Errors can likewise arise as a result of the manufacture and mounting of the angle sensor, and should be eliminated again in the application of the sensor element in order to ensure a correspondingly high measurement accuracy of the angle. Three types of error can occur here.

An offset error causes an offset in the x- and/or y-axis. An offset should be reckoned with owing to manufacture and temperatures during operation. This leads to a displacement of the measurement circle or ellipse.

An amplitude error causes an amplitude in the x- and/or y-axis. An amplitude error should be reckoned with owing to manufacture and especially temperature. This leads to a distortion of the circle into an ellipse, which however still has the major axes in the x- or y-axis.

An angle or phase error between the x- and y-components occurs for example if the sensors are not positioned orthogonally or by 90° or the sensors have not been manufactured exactly.

In summary, it may be stated that from the sum of the errors that occur, the circle to be represented becomes a general ellipse which can be displaced at any arbitrary angle around the zero point.

Figure 3:
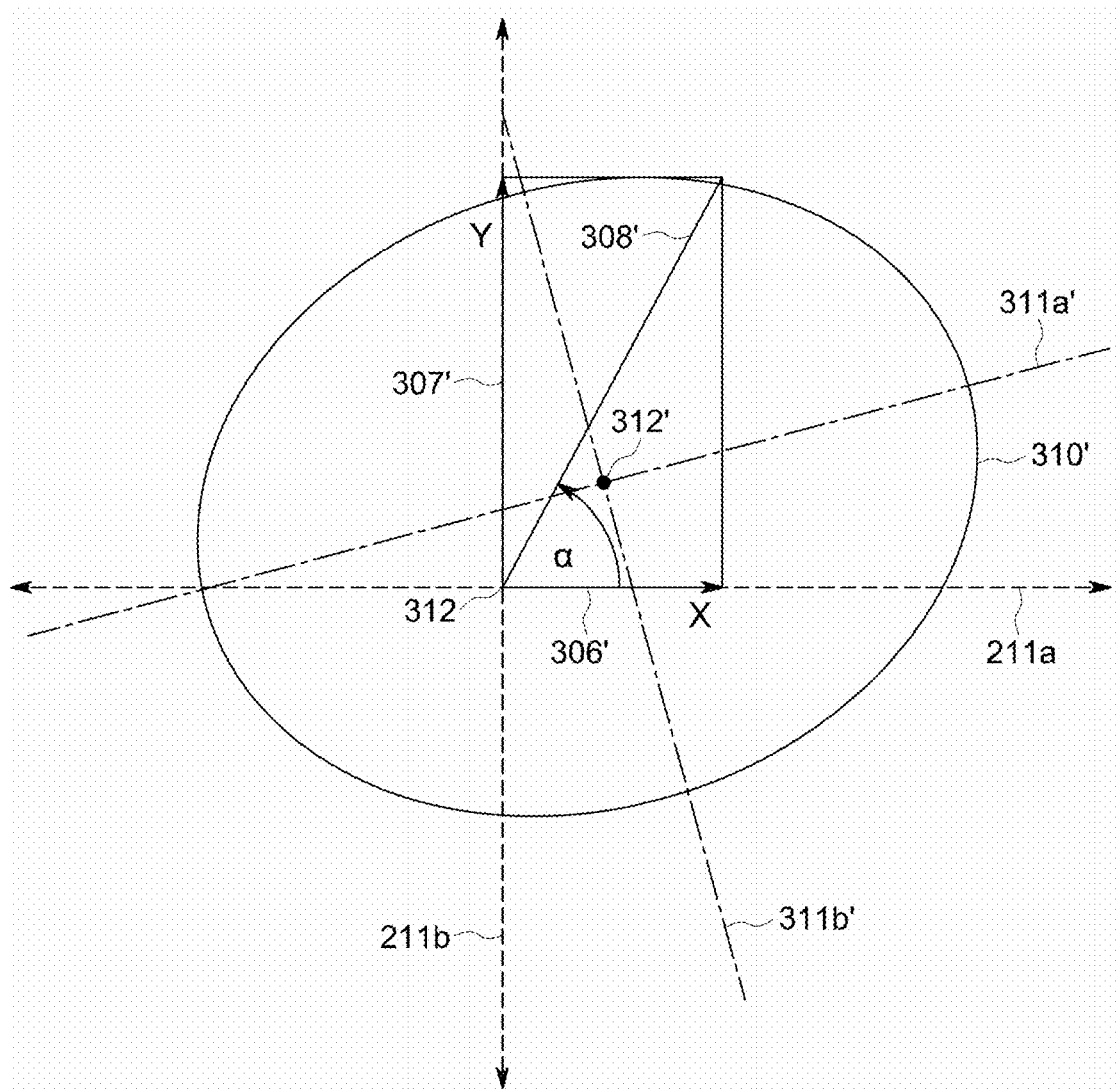
FIG. 3 shows an erroneous measurement circle.

FIG. 3 shows a distortion of the ideal circular path to an elliptic path, this distortion being caused by influences. An erroneous x-component 306' and an erroneous y-component 307' of a detected magnetic field direction 308' span a vector diagram, from which an erroneous angle α' of the detected magnetic field direction can be calculated. As a result of the erroneous x-component 306' and the erroneous y-component 307', the direction vector 308' does not describe a circle around the origin of the x-axis 211*a* and the y-axis 211*b*, but rather an ellipse 310' around a center point of an erroneous x-axis 311*a*' and an erroneous y-axis 311*b*'. An origin 312 of the circle coordinate system deviates from an origin 312' of the ellipse coordinate system. In addition, the axes of the ellipse coordinate system 311*a*', 311*b*' are rotated relative to the circle axes 211*a*, 211*b*. The erroneous ellipse axes 311*a*', 311*b*' can in addition be at an angle deviating from 90° with respect to one another.

Figure 4:
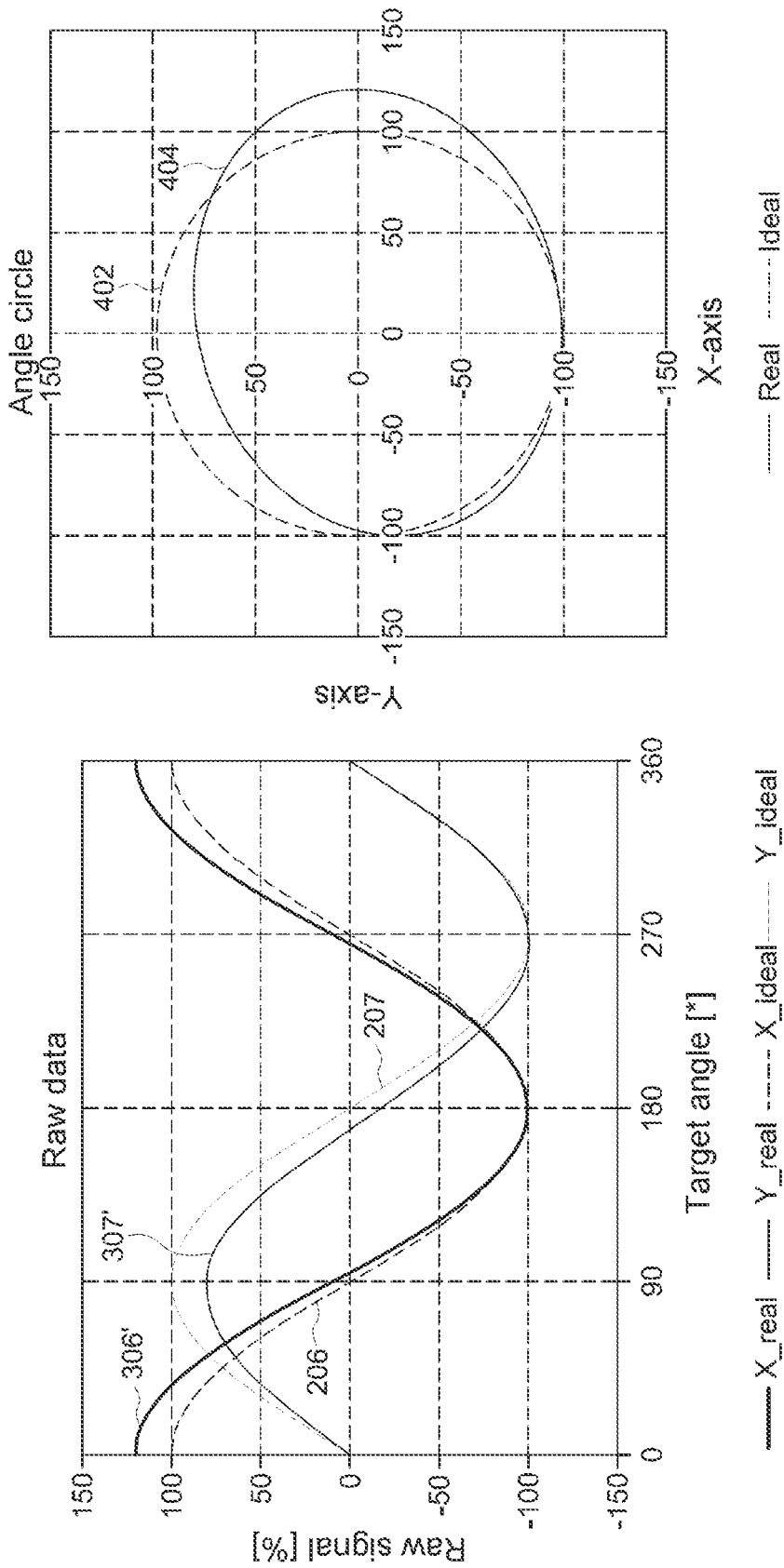
FIG. 4 shows ideal sine and cosine signals in comparison with signals with amplitude, offset and phase deviations.

FIG. 4 shows, besides a circle 402 distorted to an ellipse 404, also the associated measurement values of the erroneous x- and y-components 306', 307' in comparison with ideal x- and y-components 206, 207, said measurement values being plotted over an angle range of 0° to 360°.

The erroneous x- and y-components 306', 307' can be modeled in accordance with $$x = c1 \cdot \cos(\alpha + \chi 1) + c0$$

$$y = s1 \cdot \sin(\alpha + \sigma 1) + s0$$

In this case, c1 and s1 denote the respective amplitudes, c0 and s0 denote the respective offsets, and $\chi 1$ and $\sigma 1$ denote the respective phase shifts of the component signals x and y.

Numerous known devices and methods for self-calibration exist by means of which the above parameters c0, s0, c1, s1, $\chi 1$, $\sigma 1$ of the erroneous x- and y-components can be estimated and used for angle correction. One possibility for carrying out the self-calibration is to calculate a plurality of ellipse parameters of an ellipse equation on the basis of acquired first and second measurement values $x_i$, $y_i$ (i=1, 2, . . . , N) and, on the basis of the ellipse parameters determined, to calculate first characteristic data c0, c1, $\chi 1$ (corresponding to the Fourier component of the fundamental) of a first erroneous periodic sensor signal x', second characteristic data s0, s1, $\sigma 1$ (corresponding to the Fourier component of the fundamental) of a second erroneous periodic sensor signal y' and a phase offset $\Delta \varphi = \chi 1 - \sigma 1$ between the first and second erroneous periodic sensor signal x', y'. An alternative possibility for carrying out the self-calibration is to acquire a set of characteristic measurement points of the x- and y-signals over the 360° angle range. A typical choice that enables a simple evaluation is the x- and y-value pairs at the minimum and maximum values of each channel. As soon as these data have been acquired, compensation parameters for the offset c0, s0 and the amplitude c1, s1 can easily be found and applied to the sensor channels. The offset of a channel is the mean value of the minimum and the maximum for the channel. The amplitude of each channel is determined as half of the difference between the maximum and the minimum and can be used to adapt the amplitude of the measurement channel such that the compensated amplitude corresponds to a target value (e.g., 1). After the offset and amplitude compensation, the zero crossings of one channel can be compared with the minimum and the maximum of the other channel and the result can be used for the compensation of the phase shift between the x- and y-axes.

It is furthermore known that angle sensors do not yield ideal sine and cosine terms for the y- and x-components of the measurement field. Consequently, a compensation of the offsets, of the amplitude and of the non-orthogonality of the sensor can only attain measurement accuracies that are limited by non-compensated harmonic terms (harmonics) of the fundamental. This is shown by way of example and in an exaggerated fashion in FIG. 5.

Figure 5:
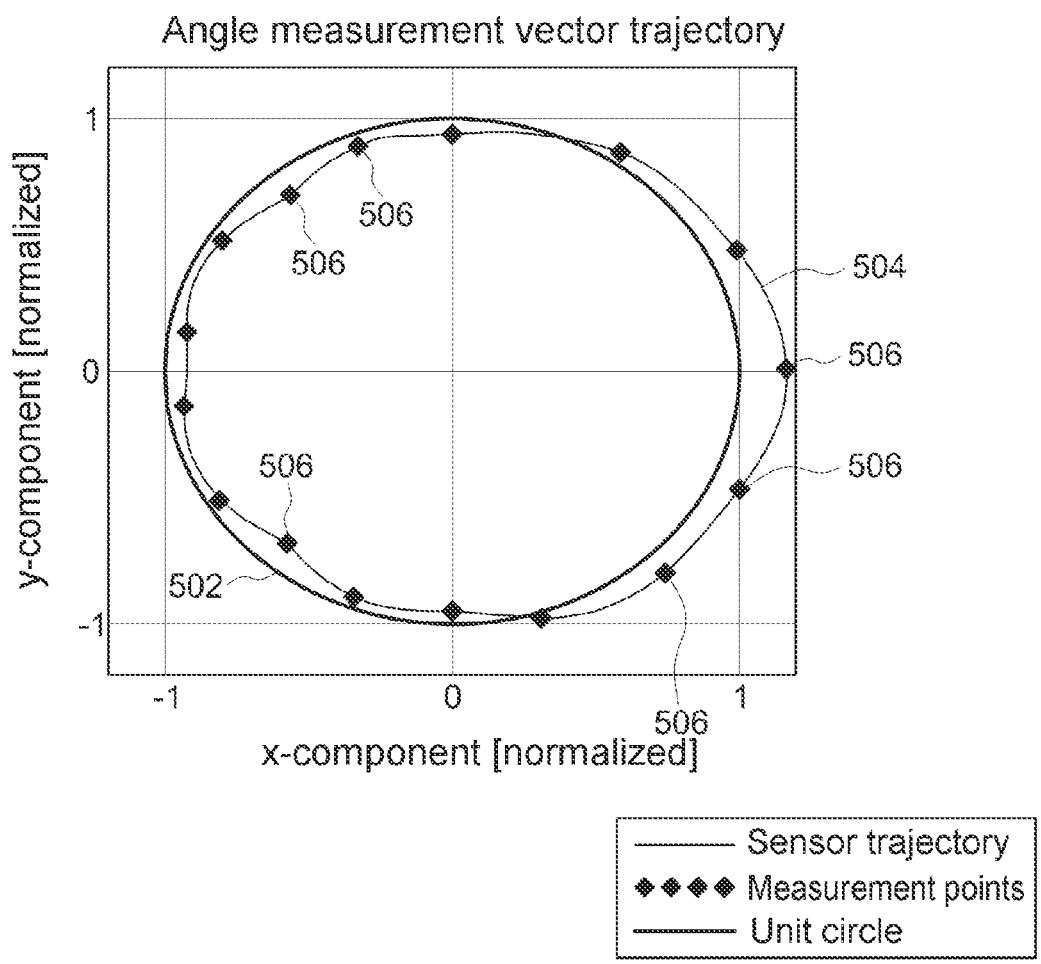
FIG. 5 shows an ideal circular path and a trajectory of fundamental-autocalibrated (equidistant) measurement points of x- and y-signals over a 360° angle range.

FIG. 5 shows an ideal circular path 502 and a trajectory 504 of already self-calibrated measurement points of the x- and y-signals over the 360° angle range. Self-calibrated here means that, as a result of determining the fundamental parameters c0, s0, c1, s1, $\chi 1$, $\sigma 1$, the ellipse displaced from the coordinate origin in FIG. 3 has already been made into a circle substantially shifted back to the coordinate origin. In this case, however, only the parameters c0, s0, c1, s1, $\chi 1$, $\sigma 1$ of the fundamental were calibrated. Non-compensated harmonics still cause a deviation of the measurement point trajectory 504 from the ideal circular path 502. The trajectory 504 illustrated in FIG. 5 contains (severe) harmonics in order to visualize the deviation from the unit circle 504 (realistic values for magnetoresistive sensors are significantly smaller). A correction can be effected by subtraction of sine and cosine terms that ideally correspond to the unwanted harmonics. The measured x- and y-signals of the trajectory 504 are necessarily 360° periodic and can thus be described as a Fourier series. One example of Fourier series for x- and y-channels would be $$x(t):=c0+c1\cdot\cos(\omega\cdot t+\chi 1)+c2\cdot\cos(2\cdot\omega\cdot t+\chi 2)+c3\cdot\cos(3\cdot\omega\cdot t+\chi 3)+c8\cdot\cos(8\cdot\omega\cdot t+\chi 8)$$

$$y(t):=s0+s1\cdot\sin(\omega\cdot t+\sigma 1)+s2\cdot\sin(2\cdot\omega\cdot t+\sigma 2)+s3\cdot\sin(3\cdot\omega\cdot t+\sigma 3)+s8\cdot\sin(8\cdot\omega\cdot t+\sigma 8)$$

wherein the parameters c0, s0, c1, s1, $\chi 1$, $\sigma 1$ denote Fourier components of the fundamental with a fundamental angular frequency $\omega$. In the example above, there are furthermore Fourier components of $2^{nd}$-, $3^{rd}$- and $8^{th}$-order harmonics. Harmonics of other orders are of course likewise conceivable and dependent on the application and/or sensors used.

Figure 6:
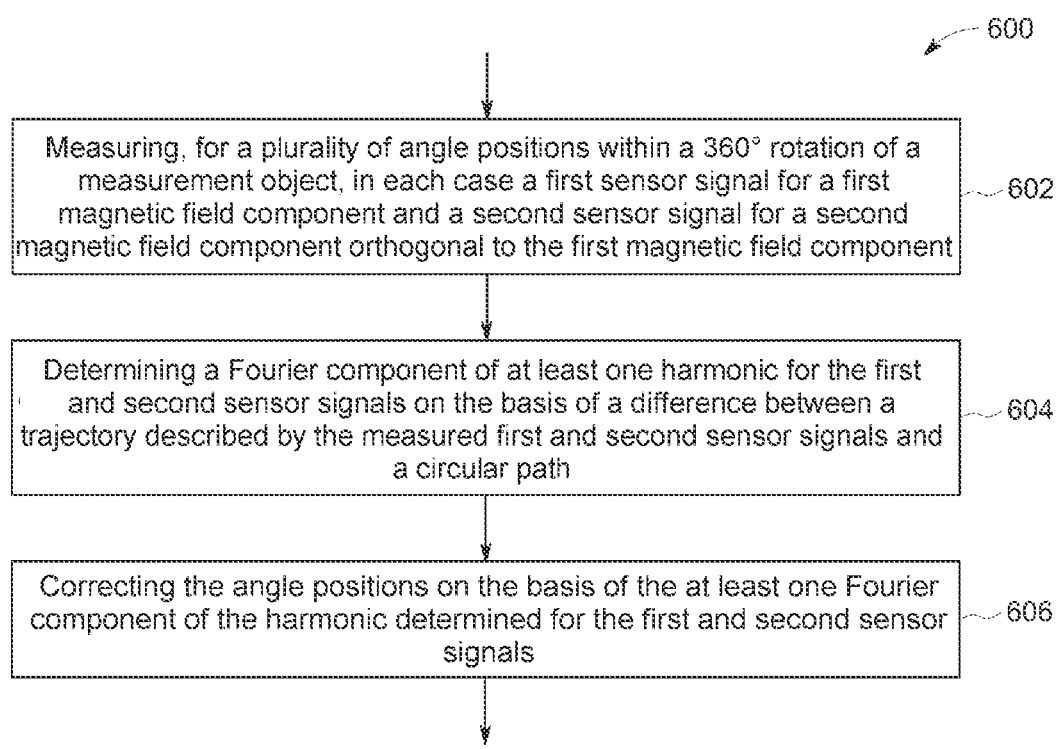
FIG. 6 shows a flow diagram of a method for calibrating a magnetic angle sensor in accordance with one exemplary embodiment of the present disclosure.

FIG. 6 schematically shows a flow diagram of a method 600 for calibrating a magnetic angle sensor in accordance with the present disclosure.

A first step 602 of the method 600 involves measuring, for a plurality of angle positions (corresponding to the measurement points 506) within a 360° rotation of a measurement object, in each case a first sensor signal for a first magnetic field component (e.g., x-component) and a second sensor signal for a second magnetic field component (e.g., y- or z-component) orthogonal to the first magnetic field component. The first and second sensor signals are in each case 360° periodic and representable as a Fourier series with in each case a Fourier component of a fundamental $$c0+c1\cdot\cos(\omega\cdot t+\chi 1) \text{ and respectively } s0+s1\cdot\sin(\omega\cdot t+\sigma 1)$$

and in each case at least one Fourier component of a harmonic $$c2\cdot\cos(2\cdot\omega\cdot t+\chi 2)+c3\cdot\cos(3\cdot\omega\cdot t+\chi 3)+c8\cdot\cos(8\cdot\omega\cdot t+\chi 8)$$
$$\text{and respectively } s2\cdot\sin(2\cdot\omega\cdot t+\sigma 2)+s3\cdot\sin(3\cdot\omega\cdot t+\sigma 3)+s8\cdot\sin(8\cdot\omega\cdot t+\sigma 8))$$

An n-th Fourier component here can comprise in each case an amplitude value cn and respectively sn, a phase value $\chi n$ and respectively $\sigma n$ and optionally also an offset value (e.g., c0 and respectively s0 for the fundamental). In accordance with the proposed method 600, step 604 involves determining at least one Fourier component of the harmonic in each case for the first and second sensor signals x(t), y(t) on the basis of a difference between the trajectory 504 described by the measured first and second sensor signals (self- or autocalibrated beforehand for the fundamental) and the ideal circular path 502 (e.g., the unit circle). The angle positions are corrected on the basis of the Fourier component of the harmonic determined for the first and second sensor signals x, y.

It should be noted that in the case of a sensor in which the fundamental is already very accurate, the correction of the offset and amplitude errors could be determined iteratively by the fit of the circle. That might be relevant to inductive sensors, if appropriate.

The self-calibration proposed here, which can be carried out for ascertaining the corrective Fourier components for eliminating the harmonic distortions, can be calculated by way of a fit of the circular path of the measurement in the x/y-plane. With the advantage that the samples used for the fit do not have to be equidistant and can even originate from different rotations. One condition to be satisfied is the satisfying of the Nyquist criterion for the highest relevant harmonic distortion of the magnetic field sensor signal.

The sensor signal for the x- and y-components of the magnetic field can be represented by sine and cosine terms of the measured magnetic field angle $\alpha=\omega t$. On account of non-idealities of the sensor, harmonics of the ideal sine and cosine signals can cause relevant errors of the angle measurement of 1°, for example. The relevant harmonics differ for different sensor technologies (e.g., AMR, GMR, TMR, Vertical Hall) and also depend on the production process. The lower-order harmonics are typically the most relevant (e.g., the $2^{nd}$ or $3^{rd}$ harmonics). However, there are also sensors which have relevant higher-order harmonics. In the case of AMR (anisotropic magnetoresistance), the $8^{th}$-order harmonic can cause relevant measurement inaccuracies for highly accurate sensors. An exemplary sensor signal after removal of offsets and amplitude errors of the fundamental by means of autocalibration algorithms according to the prior art could appear as follows.

$$x(t):=c0+c1\cdot\cos(\omega\cdot t+\chi 1)+c2\cdot\cos(2\cdot\omega\cdot t+\chi 2)+c3\cdot\cos(3\cdot\omega\cdot t+\chi 3)+c8\cdot\cos(8\cdot\omega\cdot t+\chi 8)$$

$$y(t):=s0+s1\cdot\sin(\omega\cdot t+\sigma 1)+s2\cdot\sin(2\cdot\omega\cdot t+\sigma 2)+s3\cdot\sin(3\cdot\omega\cdot t+\sigma 3)+s8\cdot\sin(8\cdot\omega\cdot t+\sigma 8)$$

In accordance with exemplary embodiments, measuring 602 the first and second sensor signals x(t), y(t) comprises an autocalibration of the fundamental, i.e., determining the parameters c0, c1, $\chi 1$ and s0, c1, $\sigma 1$ of the respective Fourier component of the fundamental by means of an error compensation or autocalibration of offset, amplitude synchronization and orthogonality of the first and second sensor signals x(t), y(t). That is to say that after an arbitrary conventional autocalibration that has been used to determine the respective fundamental Fourier components c0, c1, $\chi 1$ and s0, c1, $\sigma 1$ of the x- and y-components, the following assumptions may be made, for example:

on account of the amplitude calibration, it may be the case that c1=s1 and that is assumed to be normalized to 1 in order to simplify the following description.

on account of the offset calibration, it may be the case that c0=s0=0.

as a result of the correction of non-orthogonality, the phase shift $\chi 1$ and $\sigma 1$ of the sine and cosine signals is intended to be the same and is assumed to be 0° in order to simplify the following description.

The angle inaccuracy remaining after the fundamental autocalibration of offset, amplitude and phase of the useful signal components is caused by the harmonic terms of the Fourier series (here: $2^{nd}$, $3^{rd}$ and $8^{th}$ orders). Besides the angle inaccuracy, the harmonics also cause an inaccuracy of the squared vector length $VL^2=x^2+y^2$.

If the harmonic terms (Fourier components) were perfectly corrected, the remaining terms would be $x(t)=\cos(\omega t)$ and $y(t)=\sin(\omega t)$ and thus $\alpha=\omega t=\arctan(y/x)$ and $x^2+y^2=1$. It is evident therefrom that the vector length VL can be used to find the correct compensation coefficients for the n-th order harmonic terms (Fourier components) cn, $\chi n$, sn, $\sigma n$.

The self-calibration algorithm proposed here takes a set of samples of the pairs—uncorrected in relation to the harmonic terms—of x- and y-samples 506 which are distributed around the trajectory 504 which has an angle-dependent vector length VL which differs from the ideal unit circle 502 ($VL(\omega t) \neq 1$). One condition that should be satisfied for the selection of the samples 506 is the Nyquist theorem for each of the harmonics to be compensated for, that is to say for a short time $\geq 2n$ samples for the n-th harmonic. In this case, a dedicated measurement value data set with e.g., 2n samples can be generated and used for each of the harmonics to be compensated for, or a measurement value data set for the highest harmonic to be compensated for can be used for each of the harmonics to be compensated for. The plurality of the measured angle positions within the 360° rotation of the measurement object should therefore satisfy the Nyquist-Shannon sampling theorem for the at least one or highest harmonic to be taken into account.

The trajectory 504 contains severe harmonics in order to visualize the deviation from the unit circle 502 (realistic values for XMR sensors are significantly smaller and will be shown later). The correction can be effected by subtraction of sine and cosine terms that would ideally correspond to the unwanted harmonics.

Since the exact angle $\alpha$ is not known even after the fundamental autocalibration, the harmonic terms can be calculated on the basis of the uncorrected angle $\alpha(t)=\arctan(y(t)/x(t))$, which deviates from the ideal angle value $\alpha=\omega t$ by an angle error $\Delta\alpha$ to be corrected. Consequently, however, the calculated harmonic terms do not ideally correspond to the unwanted harmonics and still leave a (small) residual error. However, this residual error can optionally be reduced iteratively by starting a subsequent iteration with the previously corrected angle.

$$x1(t,ax2,\alpha x2,ax3,\alpha x3,ax8,\alpha x8):=x(t)-(ax2\cdot\cos(2\alpha(x(t),y(t))+\alpha x2))-(ax3\cdot\cos(3\alpha(x(t),y(t))+\alpha x3))-(ax8\cdot\cos(8\alpha(x(t),y(t))+\alpha x8))$$

$$y1(t,ay2,\alpha y2,ay3,\alpha y3,ay8,\alpha y8):=y(t)-(ay2\cdot\sin(2\alpha(x(t),y(t))+\alpha y2))-ay3\cdot\sin(3\alpha(x(t),y(t))+\alpha y3)-(ay8\cdot\sin(8\alpha(x(t),y(t))+\alpha y8))$$

Here $x1(t)$ denotes an x-signal corrected in accordance with the proposed method, $y1(t)$ denotes a y-signal corrected in accordance with the proposed method, $2\alpha(x(t), y(t))=2\arctan(y(t)/x(t))$ and ax2, $\alpha x2$ correspond to estimated values for c2 and $\chi 2$. ax3, $\alpha x3$ correspond to estimated values for c3 and $\chi 3$. ax8, $\alpha y8$ correspond to estimated values for c8 and $\chi 8$. ay2, $\alpha y2$ correspond to estimated values for s2 and $\sigma 2$. ay3, $\alpha y3$ correspond to estimated values for s3 and $\sigma 3$. ay8, $\alpha y8$ correspond to estimated values for s8 and $\sigma 8$.

Each correction term contains an unknown amplitude axn and respectively ayn and an unknown phase shift $\alpha xn$ and respectively $\alpha yn$ for the harmonic term (Fourier component) of the n-th harmonic ($n\geq 2$). These unknown estimated values can be found iteratively by minimizing the area between the corrected trajectory of (x1, y1) and the ideal unit circle 502.

The estimated values for amplitude axn and respectively ayn, and phase shift $\alpha xn$ and respectively $\alpha yn$ can thus be determined by means of a compensation calculation method, such that a deviation between the circular path 502 and a trajectory described by the first and second sensor signals supplemented by the respective estimated Fourier components axn and respectively ayn, and $\alpha xn$ and respectively $\alpha yn$, becomes minimal. By way of example, the Fourier components axn and respectively ayn, and $\alpha xn$ of the harmonics can be determined by means of the least mean squares (LMS=Least Mean Squares) method. Other known compensation calculation methods are likewise conceivable.

Since the harmonics of different orders are orthogonal functions, the estimation or optimization thereof can be carried out independently for each harmonic term and also independently for the x- and y-components, which reduces the complexity of the minimization to two dimensions. That is to say that, in accordance with exemplary embodiments, a Fourier component of a harmonic for the first sensor signal x(t) can be determined independently of a Fourier component of a harmonic for the second sensor signal y(t). Furthermore, a Fourier component of an m-th order harmonic can be determined independently of a Fourier component of an n-th order harmonic.

In accordance with one exemplary embodiment, the method 600 could be manifested in greater detail as follows:

1) acquiring or measuring a set of x- and y-values 506 (autocalibrated in relation to fundamental components) that satisfy the sampling theorem.

2) calculating, for each pair x(t), y(t), the angle $\alpha(t)$ from x(t) and y(t)
  a) loop sequentially over all relevant harmonics
    i) loop over x- and y-components
      (1) find minimum of the deviation between unit circle 502 and trajectory of (x1,y1) (e.g., measured by $(x1^2+y1^2-1)^2$ as a function of amplitude coefficient axn and respectively ayn and phase shift axn and respectively ayn of the current Fourier component
      (2) acquiring the updated amplitude axn and respectively ayn and phase axn and respectively ayn of the correction term
    ii) end of the loop over x- and y-components
  b) end of the loop over the relevant harmonics
3) creating a look-up table with differences between $\alpha=\arctan(y/x)$ and $\alpha 1=\arctan(y1/x1)$.

The corrected values $x1(t)$, $y1(t)$ and $\alpha 1(t)$ could then in turn serve as a basis for a further correction stage by $x2(t)$, $y2(t)$ and $\alpha 2(t)$ being determined therefrom in a further iteration according to the above method, etc.

Correcting 606 the angle position thus comprises correcting the first sensor signal x(t) corresponding to the angle position $\alpha(t)$ on the basis of the at least one Fourier component determined for the first sensor signal x(t) (amplitude axn as estimated value for cn and phase $\alpha xn$ as estimated value for $\chi n$) in order to obtain a corrected first sensor signal $x1(t)$. Furthermore, correcting 606 the angle position comprises correcting the second sensor signal y(t) corresponding to the angle position $\alpha(t)$ on the basis of the at least one Fourier component determined for the second sensor signal y(t) (amplitude ayn as estimated value for sn and phase $\alpha yn$ as estimated value for an) in order to obtain a corrected second sensor signal $y1(t)$. A tangent function (e.g., arc-tangent) of the corrected first and second sensor signals x1, y1 is formed, such as e.g., $\alpha 1=\arctan(y1/x1)$. The angle error $\Delta\alpha$ to be corrected results from $\alpha-\alpha 1$.

Figure 7:
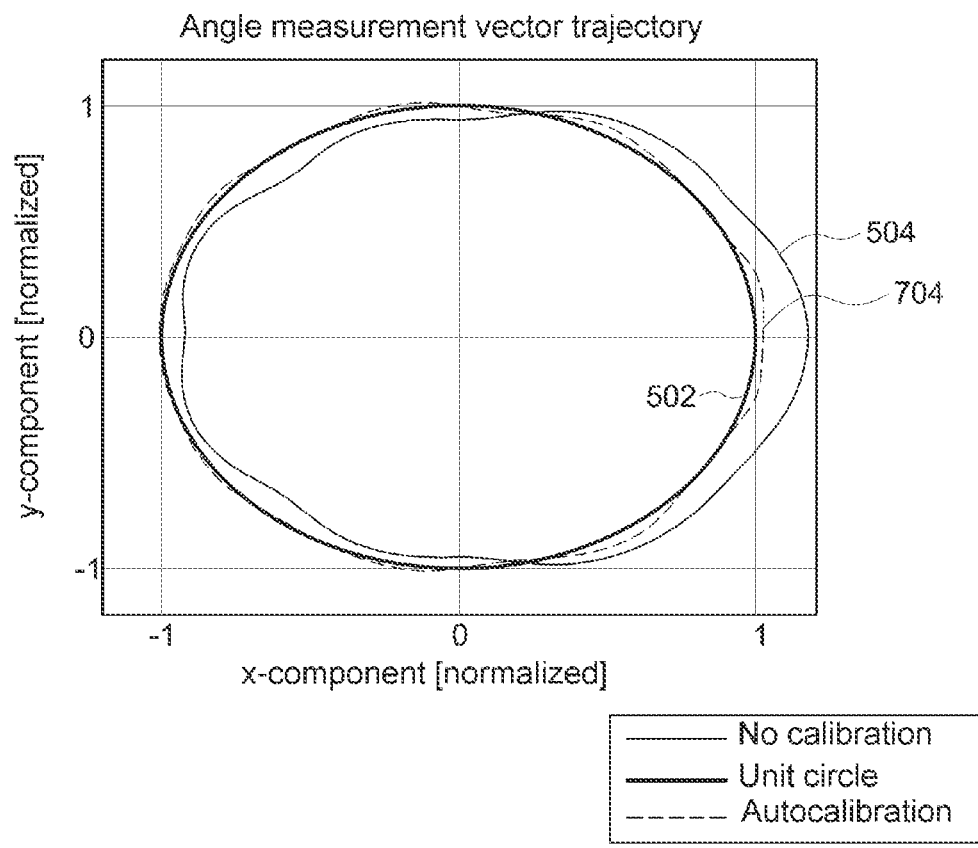
FIG. 7 shows an ideal circular path, a trajectory of fundamental-autocalibrated measurement points of x- and y-signals and a trajectory of additionally harmonic-calibrated measurement points of x- and y-signals over a 360° angle range (exaggerated)
Figure 8:
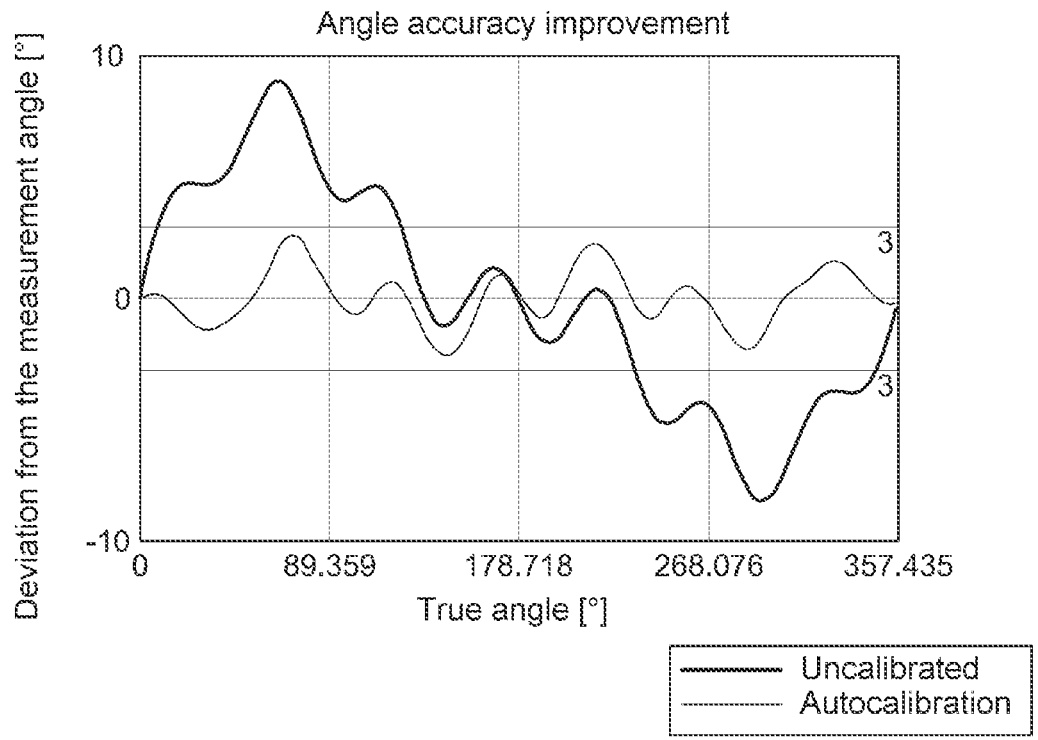
FIG. 8 shows a difference between uncalibrated and calibrated angle errors (exaggerated)

FIGS. 7 and 8 show an exemplary result of the correction. The deviation of an (x1,y1) trajectory 704—corrected in accordance with the proposed method 600—from the unit circle 502 in comparison with the original (x,y) trajectory 504 is significantly reduced. The remaining inaccuracy results from the calculation of the correction terms (harmonic terms or Fourier components) as a function of the inaccurate angle $\alpha=\arctan(y/x)$ instead of the accurate angle. Consequently, the remaining inaccuracy decreases more than proportionally with a reduction of the inaccuracy of the initial measurement. Since the proposed autocalibration reduces an inaccuracy of the vector length VL by cancellation or compensation of the harmonic Fourier terms which are the source of the angle inaccuracy, the resulting angle accuracy is improved.

In order to elucidate the proposed concept, an inaccuracy of the initial measurement (trajectory 504) of <10° was chosen, although this is an order of magnitude too high in comparison with a realistic magnetic field sensor, which typically yields an initial accuracy of <1°. FIG. 8 shows that a reduction of the inaccuracy from almost 10° to almost 3° can be achieved with the proposed method.

Figure 9:
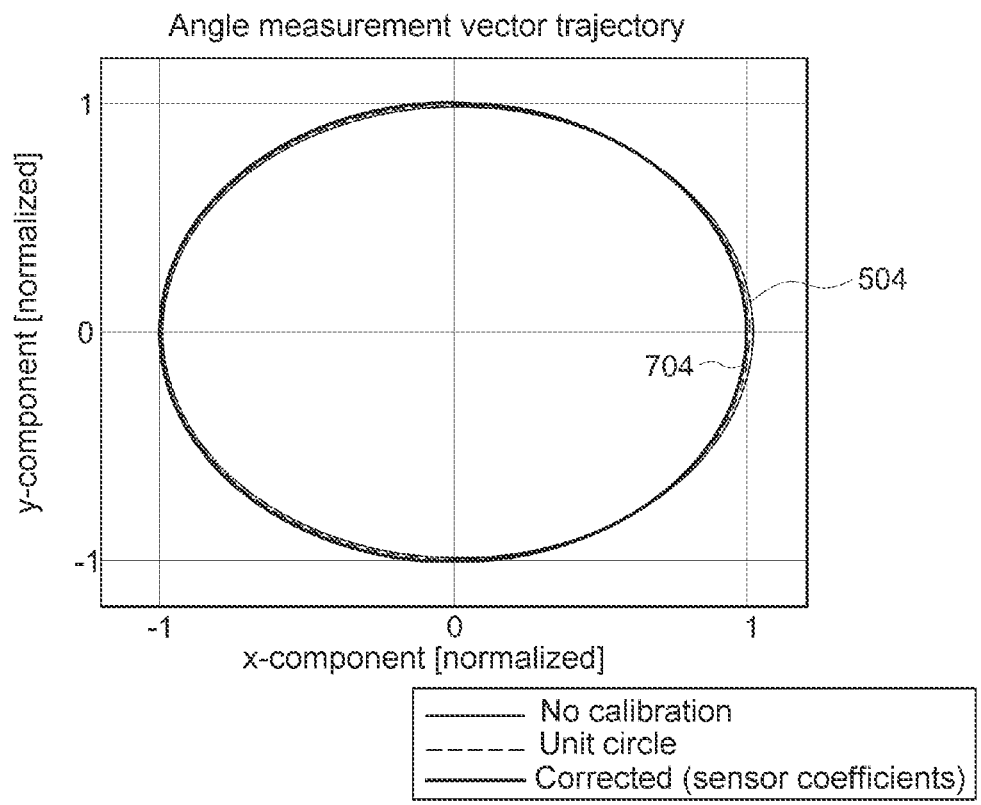
FIG. 9 shows an ideal circular path, a trajectory of fundamental-autocalibrated measurement points of x- and y-signals and a trajectory of additionally harmonic-calibrated measurement points of x- and y-signals over a 360° angle range (realistic)
Figure 10:
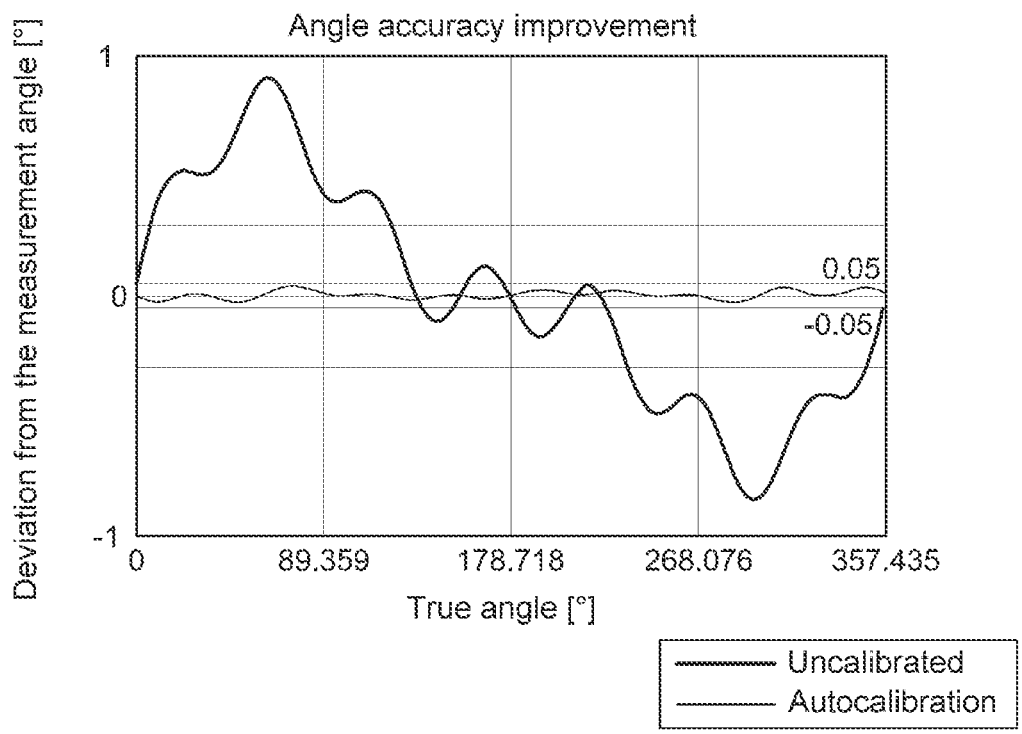
FIG. 10 shows a difference between uncalibrated and calibrated angle errors (realistic)

FIGS. 9 and 10 show similar results for realistic sensor accuracies. Here, too, it is evident that there is an increase in the accuracy improvement factor as a result of the autocalibration if the initial sensor inaccuracy is lower. This is attributable to the additional improvement of the correction terms, which are able to cancel out the harmonic terms more accurately. An initial inaccuracy of approximately 0.9° can be improved to inaccuracies of <0.05°.

Figure 11:
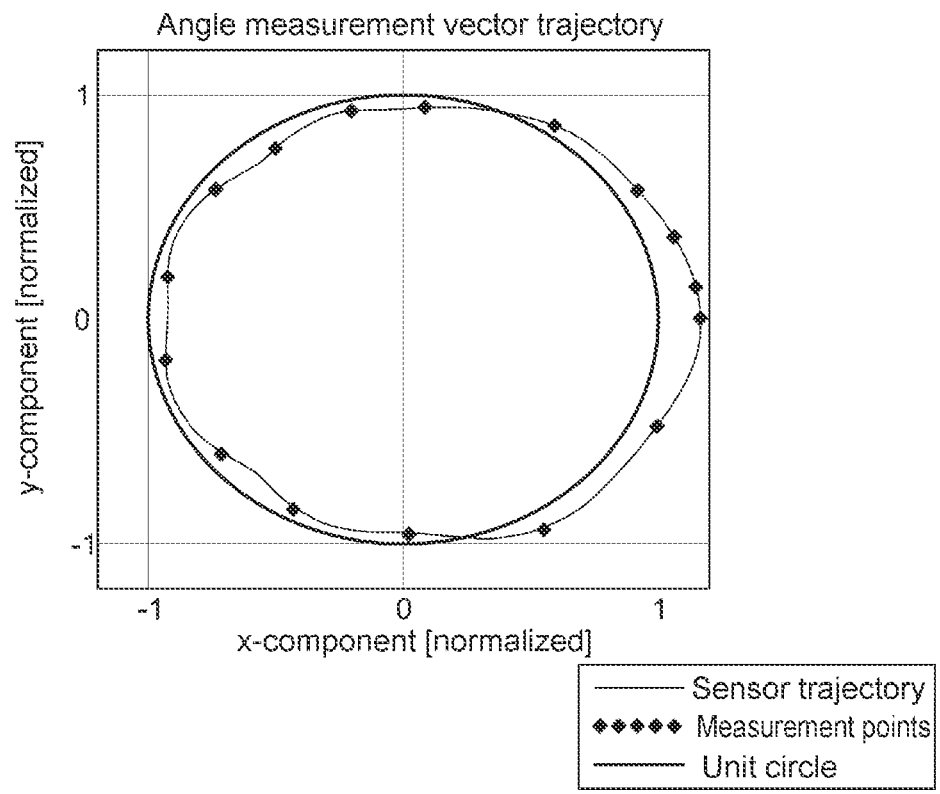
FIG. 11 shows an ideal circular path and a trajectory of fundamental-autocalibrated (non-equidistant) measurement points of x- and y-signals over a 360° angle range.
Figure 12:
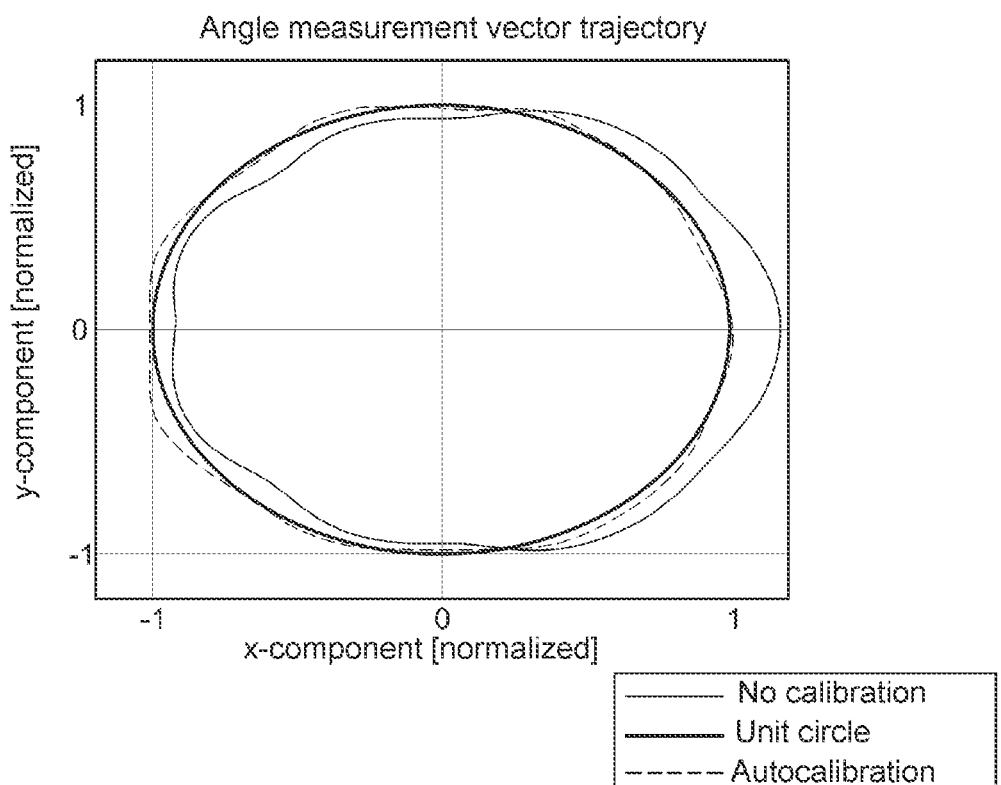
FIG. 12 shows an ideal circular path, a trajectory of fundamental-autocalibrated (non-equidistant) measurement points of x- and y-signals and a trajectory of additionally harmonic-calibrated measurement points of x- and y-signals over a 360° angle range.
Figure 13:
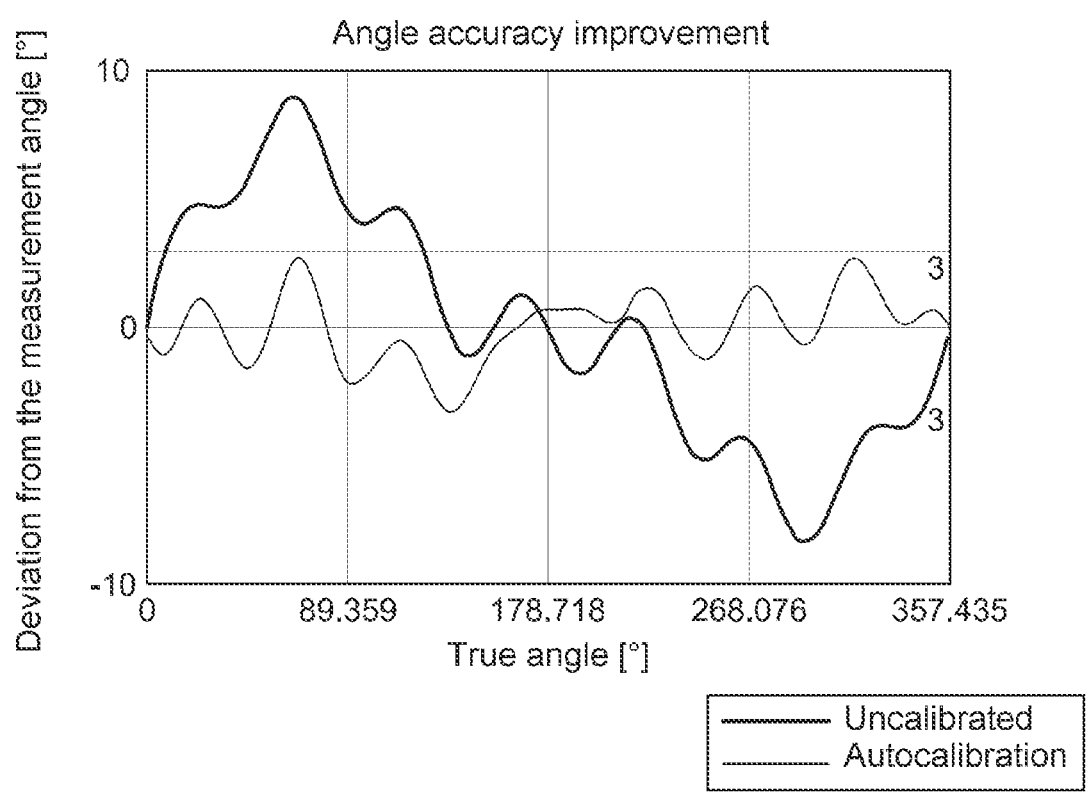
FIG. 13 shows a difference between uncalibrated and calibrated angle errors (exaggerated)

FIGS. 11 to 13 prove that the proposed autocalibration of the harmonic terms on the basis of vector length adaptation also functions in the case of non-equidistant samplings e.g., during an accelerated rotation (once again with the higher inaccuracy of <10° for the sake of better visualization). This can be regarded as a significant advantage over a conventional determination of the parameter set for the compensation of the harmonic distortion by means of FFT, which requires angle-equidistant samples that have to be acquired at a constant speed or interpolated to constant angular distances before the FFT processing.

Figure 14:
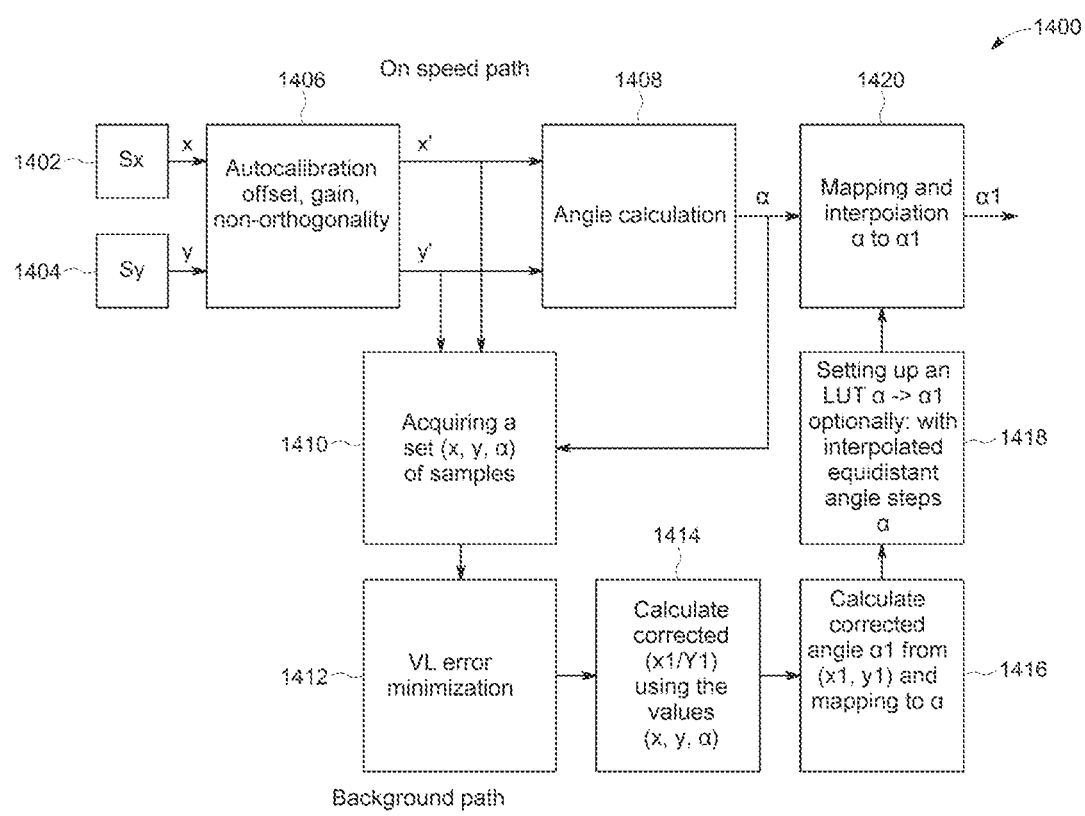
FIG. 14 shows a block diagram of a device for calibrating a magnetic angle sensor in accordance with one exemplary embodiment of the present disclosure.

FIG. 14 schematically shows a block diagram of a device 1400 for calibrating a magnetic angle sensor in accordance with one exemplary embodiment of the present disclosure. The device 1400 is configured to carry out a method 600 in accordance with the present disclosure.

The device 1400 comprises a first magnetic field sensor 1402 for a first magnetic field component (e.g., x-component) and a second magnetic field sensor 1404 for a second magnetic field component (e.g., y-component) orthogonal to the first magnetic field component. The magnetic field sensors 1402, 1404 serve for measuring, for a plurality of angle positions within a 360° rotation of a measurement object, in each case a first sensor signal x(t) for the first magnetic field component and a second sensor signal y(t) for the second magnetic field component orthogonal to the first magnetic field component.

The sensor signals x, y are fed to an autocalibration block 1406 in order to estimate the parameters c0, s0, c1, s1, χ1, σ1 of the erroneous x- and y-sensor signals and to use them for angle correction concerning the fundamental. To that end, the autocalibration block 1406 yields at its output calibrated or error-compensated sensor signals x', y' in relation to the fundamental. These error-compensated sensor signals x', y' produce the trajectory 504. From these error-compensated sensor signals x', y', in each case a first estimated value for the rotation angle α can be calculated in an angle calculation block 1408. The error-compensated sensor signals x', y' and also the associated first estimated values for the rotation angle α(t) can be formed for a plurality of angle positions within 360° and be combined into a set of samples in block 1410. On the basis thereof, in block 1412 it is possible to carry out the above-described method for minimizing the deviation between unit circle 502 and trajectory 704 of (x1,y1) (e.g., measured by way of $(x1^2+y1^2-1)^2$) as a function of the amplitude coefficients axn and respectively ayn and phase shifts αxn and respectively αyn. From that it is then possible to determine the corrected samples (x1,y1) in block 1414 and to calculate the corrected rotation angles α1=arctan(y1/x1) in block 1416. In block 1420, a mapping specification between input angles α and corrected angles α1 can be stored in a look-up table. Optionally, interpolated values between the samples can also be stored. The look-up table can then be used in block 1420 in order to obtain a second, improved estimated value α1 from a first estimated value α (from block 1408). Blocks 1406 to 1420 can be realized for example within a programmable hardware component, such as e.g., a digital signal processor (DSP).

The proposed architecture for implementing the invention can be divided into a fast branch comprising blocks 1402, 1404, 1406, 1408 and 1420 and a background path comprising the remaining blocks 1410, 1412, 1414, 1416, 1418. The fast branch can yield the measurement results with a timing which is fast enough for an application. The background path carries out the described autocalibration algorithm in parallel with a plurality of measurements. When the algorithm is concluded, the corrected angle α1 can be derived by calculating (x1,y1) as a function of (x, y, α) and then carrying out the arctan calculation. However, the calculation of many sine and cosine correction terms would require a high numerical computation power in order to carry it out simultaneously with the measurement. Therefore, a preferred implementation uses a look-up table with interpolation between the stored points that maps α to α1. The look-up table can use the same points that were acquired for the autocalibration, but it can also interpolate between the points of the autocalibration data in order to obtain the angles which the LUT output points select in order to obtain equidistant input angle steps between the table entries. The look-up table can be updated whenever a calibration run has ended. In order to avoid relatively large jumps in the angle signal, the updating of the LUT must not completely discard the old table entry, but rather corrects it by a specific percentage in the direction of the new result for the same point.

The aspects and features that have been described together with one or more of the examples and figures described in detail above can also be combined with one or more of the other examples in order to replace an identical feature of the other example or in order additionally to introduce the feature into the other example.

Examples can furthermore be or relate to a computer program comprising a program code for carrying out one or more of the above methods when the computer program is executed on a computer or processor. Steps, operations or processes of various methods described above can be performed by programmed computers or processors. Examples can also cover program storage devices, e.g., digital data storage media, which are machine-, processor- or computer-readable and code machine-executable, processor-executable or computer-executable programs of instructions. The instructions carry out some or all of the steps of the methods described above or cause them to be carried out. The program storage devices can comprise or be e.g., digital memories, magnetic storage media such as, for example, magnetic disks and magnetic tapes, hard disk drives or optionally readable digital data storage media. Further examples can also cover computers, processors or control units which are programmed to carry out the steps of the methods described above, or (field) programmable logic arrays ((F)PLAs=(Field) Programmable Logic Arrays) or (field) programmable gate arrays ((F)PGAs=(Field) Programmable Gate Arrays) which are programmed to carry out the steps of the methods described above.

The description and drawings present only the principles of the disclosure. Furthermore, all examples mentioned here are intended to be used expressly only for illustrative purposes, in principle, in order to assist the reader in understanding the principles of the disclosure and the concepts contributed by the inventor(s) for further development of the art. All statements herein regarding principles, aspects and examples of the disclosure and also concrete examples thereof encompass the counterparts thereof.

A function block referred to as "means for . . . " implementing a specific function can relate to a circuit configured for implementing a specific function. Consequently, a "means for something" can be implemented as a "means configured for or suitable for something", e.g., a component or a circuit configured for or suitable for the respective task.

Functions of various elements shown in the figures, including any function blocks referred to as "means", "means for providing a signal", "means for generating a signal", etc., can be implemented in the form of dedicated hardware, e.g., "a signal provider", "a signal processing unit", "a processor", "a controller", etc., and as hardware capable of executing software in conjunction with associated software. When provided by a processor, the functions can be provided by a single dedicated processor, by a single jointly used processor or by a plurality of individual processors, some or all of which can be used jointly. However, the term "processor" or "controller" is on no account limited to hardware exclusively capable of executing software, but rather can encompass digital signal processor hardware (DSP hardware), network processor, application specific integrated circuit (ASIC), field programmable gate array (FPGA), read only memory (ROM) for storing software, random access memory (RAM) and nonvolatile storage device. Other hardware, conventional and/or customized, can also be included.

A block diagram can represent a rough circuit diagram, for example, which implements the principles of the disclosure. In a similar manner, a flow diagram, a flow chart, a state transition diagram, a pseudo-code and the like can represent various processes, operations or steps which for example are substantially represented in a computer-readable medium and thus executed by a computer or processor, regardless of whether such a computer or processor is explicitly shown. Methods disclosed in the description or in the patent claims can be implemented by a component which has a means for carrying out each of the respective steps of these methods.

It goes without saying that the disclosure of a plurality of steps, processes, operations or functions disclosed in the description or in the claims should not be interpreted as being in the specific order, unless this is explicitly or implicitly indicated otherwise, for example for technical reasons. The disclosure of a plurality of steps or functions therefore does not limit them to a specific order unless said steps or functions are not interchangeable for technical reasons. Furthermore, in some examples, an individual step, function, process or operation can include a plurality of partial steps, partial functions, partial processes or partial operations and/or be subdivided into them. Such partial steps can be included and can be part of the disclosure of said individual step, provided that they are not explicitly excluded.

Furthermore, the claims that follow are hereby incorporated in the detailed description, where each claim can be representative of a separate example by itself. While each claim can be representative of a separate example by itself, it should be taken into consideration that—although a dependent claim can refer in the claims to a specific combination with one or more other claims—other examples can also encompass a combination of the dependent claim with the subject matter of any other dependent or independent claim. Such combinations are explicitly proposed here, provided that no indication is given that a specific combination is not intended. Furthermore, features of a claim are also intended to be included for any other independent claim, even if this claim is not made directly dependent on the independent claim.

What is claimed is:

1. A method for calibrating a magnetic angle sensor, comprising:
   measuring, for each angle position of a plurality of angle positions within a 360° rotation of a measurement object, a first sensor signal for a first magnetic field component and a second sensor signal for a second magnetic field component aligned orthogonal to the first magnetic field component,
   wherein, over the plurality of angle positions, the first sensor signal and the second sensor signal are each 360° periodic and representable as a Fourier series with a Fourier component of a fundamental frequency and at least one Fourier component of a harmonic;
   determining the at least one Fourier component of the harmonic for the first sensor signal and the second sensor signal based on a difference between a 360° trajectory of an angle measurement vector, defined by the first sensor signal and the second sensor signal, and a circular path; and
   correcting the plurality of angle positions based on the at least one Fourier component of the harmonic determined for the first sensor signal and second sensor signal.

2. The method of claim 1, wherein the at least one Fourier component of the harmonic for the first sensor signal is determined independently of the at least one Fourier component of the harmonic for the second sensor signal.

3. The method of claim 2, wherein the at least one Fourier component of the harmonic for the first sensor signal comprises a Fourier component of an m-th order harmonic, and wherein the at least one Fourier component of the harmonic for the second sensor signal comprises a Fourier component of an n-th order harmonic, wherein m≥2, n≠m, and n≥2.

4. The method of claim 1, wherein correcting the plurality of angle positions comprises:
   correcting the first sensor signal corresponding to an angle position of the plurality of angle positions based on the at least one Fourier component of the harmonic determined for the first sensor signal in order to obtain a corrected first sensor signal;
   correcting the second sensor signal corresponding to the angle position based on the at least one Fourier component of the harmonic determined for the second sensor signal in order to obtain a corrected second sensor signal; and
   applying a tangent function to the corrected first sensor signal and the corrected second sensor signal.

5. The method of claim 1, wherein the at least one Fourier component of the harmonic for the first sensor signal the second sensor signal is determined by a compensation calculation method that minimizes a deviation between the circular path and the 360° trajectory of the angle measurement vector.

6. The method of claim 5, wherein the at least one Fourier component of the harmonic for the first sensor signal and the second sensor signal is determined by a least mean squares method.

7. The method of claim 1, further comprising:
   storing, after correcting the plurality of angle positions, the plurality of angle positions in a look-up table.

8. The method of claim 1, wherein the plurality of angle positions within the 360° rotation of the measurement object satisfies a Nyquist-Shannon sampling theorem for the harmonic for the first sensor signal and the second sensor signal.

9. The method of claim 1, wherein the at least one Fourier component of the harmonic for the first sensor signal and the second sensor signal comprises a corresponding Fourier coefficient and phase value.

10. The method of claim 1, wherein the at least one Fourier component of the harmonic for the first sensor signal and the second sensor signal is determined by an error compensation of a mean value offset, amplitude synchronization, and orthogonality of the first sensor signal and the second sensor signal.

11. A method for calibrating a magnetic angle sensor, comprising:
measuring, for each angle position of a plurality of angle positions within a 360° rotation of a measurement object, a first sensor signal for a first magnetic field component and a second sensor signal for a second magnetic field component aligned orthogonal to the first magnetic field component,
wherein, over the plurality of angle positions, the first sensor signal and the second sensor signal are each 360° periodic and representable as a Fourier series with a Fourier component of a fundamental frequency and at least one Fourier component of a harmonic;
determining the at least one Fourier component of the harmonic for the first sensor signal and the second sensor signal based on a deviation between a circular path and a 360° trajectory of an angle measurement vector defined by the first and the second sensor signals supplemented by the at least one Fourier components of the harmonic for the first sensor signal and the second sensor signal; and
correcting the plurality of angle positions based on the at least one Fourier component of the harmonic determined for the first sensor signal and the second sensor signal.

12. The method as claimed in claim 11, wherein the at least one Fourier component of the harmonic for the first sensor signal and the second sensor signal is determined by a compensation calculation that minimizes the deviation between the circular path and the 360° trajectory of the angle measurement vector.

13. A device for calibrating a magnetic angle sensor, the device comprising:
a first magnetic field sensor configured to generate a first sensor signal in response to a first magnetic field component;
a second magnetic field sensor configured to generate a second sensor signal in response to a second magnetic field component that is aligned orthogonal to the first magnetic field component; and
a processing circuit configured to:
measure, for each angle position of a plurality of angle positions within a 360° rotation of a measurement object, the first sensor signal and the second sensor signal,
wherein, over the plurality of angle positions, the first sensor signal and the second sensor signal are each 360° periodic and representable as a Fourier series with a Fourier component of a fundamental frequency and at least one Fourier component of a harmonic,
determine the at least one Fourier component of the harmonic for the first sensor signal and the second sensor signal based on a difference between a 360° trajectory of an angle measurement vector defined by the measured first and the second sensor signals and a circular path, and
correct the plurality of angle positions based on the at least one Fourier component of the harmonic determined for the first sensor signal and second sensor signal.

14. The device of claim 13, wherein:
the first magnetic field sensor comprises a first bridge circuit comprising a first plurality of sensor elements, the first sensor signal is a first bridge voltage that corresponds to the first magnetic field component, and
the second magnetic field sensor comprises a second bridge circuit comprising a second plurality of sensor elements, the second sensor signal is a second bridge voltage that corresponds to the second magnetic field component.

15. The device of claim 13, wherein the at least one Fourier component of the harmonic for the first sensor signal is determined independently of the at least one Fourier component of the harmonic for the second sensor signal.

16. The device of claim 15, wherein the at least one Fourier component of the harmonic for the first sensor signal comprises a Fourier component of an m-th order harmonic, and wherein the at least one Fourier component of the harmonic for the second sensor signal comprises a Fourier component of an n-th order harmonic, wherein m≥2, n≠m, and n≥2.

17. The device of claim 13, wherein, to correct the plurality of angle positions, the processing circuit is configured to:
correct the first sensor signal corresponding to an angle position of the plurality of angle positions based on the at least one Fourier component of the harmonic determined for the first sensor signal in order to obtain a corrected first sensor signal;
correct the second sensor signal corresponding to the angle position based on the at least one Fourier component of the harmonic determined for the second sensor signal in order to obtain a corrected second sensor signal; and
apply a tangent function to the corrected first sensor signal and the corrected second sensor signal.

18. The device of claim 13, wherein the at least one Fourier component of the harmonic for the first sensor signal the second sensor signal is determined by a compensation calculation method.

19. The device of claim 13, wherein the at least one Fourier component of the harmonic for the first sensor signal and the second sensor signal is determined by a least mean squares method.

20. The device of claim 13, wherein the processing circuit is further configured to:
store, after correcting the plurality of angle positions, the plurality of angle positions in a look-up table.

* * * * *